United States Patent
Lundqvist et al.

(10) Patent No.: US 10,345,027 B1
(45) Date of Patent: Jul. 9, 2019

(54) APPLIANCE INSTALLATION PAN

(71) Applicant: Dometic Sweden AB, Solna (SE)

(72) Inventors: Anton Lundqvist, Solna (SE); Mark Fazi, Osceola, IN (US)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 15/406,967

(22) Filed: Jan. 16, 2017

Related U.S. Application Data

(60) Provisional application No. 62/279,975, filed on Jan. 18, 2016.

(51) Int. Cl.
*F25D 19/00* (2006.01)
*F16M 11/04* (2006.01)

(52) U.S. Cl.
CPC ........... *F25D 19/00* (2013.01); *F16M 11/048* (2013.01); *F25D 2323/0011* (2013.01); *F25D 2400/32* (2013.01)

(58) Field of Classification Search
CPC .................. F25D 19/00; F25D 19/003; F25D 2323/0011; F25D 2400/32; F16M 11/048
USPC ................... 312/351.1–351.2; 248/500–501, 248/346.01–346.03; 206/320; 410/66–67, 80; 108/55.1, 57.17
See application file for complete search history.

(56) References Cited

U.S. PATENT DOCUMENTS

| | | | | |
|---|---|---|---|---|
| 3,958,712 A | * | 5/1976 | Martin | B65D 9/34 217/40 |
| 3,962,660 A | * | 6/1976 | Duckett | H01F 27/002 336/65 |
| 4,669,696 A | | 6/1987 | Petta | |
| 4,848,247 A | * | 7/1989 | Kuipers | B65D 19/0014 108/52.1 |
| 5,791,150 A | * | 8/1998 | Bosher | F25D 11/003 62/236 |
| 6,035,790 A | * | 3/2000 | Polando | B65D 19/44 108/55.1 |
| 2003/0000433 A1 | * | 1/2003 | Duley | F16M 5/00 108/51.11 |
| 2004/0226309 A1 | * | 11/2004 | Broussard | F25D 11/003 62/236 |

(Continued)

FOREIGN PATENT DOCUMENTS

| | | |
|---|---|---|
| CN | 201964711 | 9/2011 |
| CN | 203255016 | 10/2013 |
| JP | 2011231977 | 11/2011 |

OTHER PUBLICATIONS

ARB Full Extension Fridge Slide dated Feb. 2014.

(Continued)

*Primary Examiner* — Christopher Garft
(74) *Attorney, Agent, or Firm* — Middleton Reutlinger

(57) ABSTRACT

Present embodiments relate to an appliance installation pan which provides multi-functional improvement for at least installation, collection of fluid, and direction of air flow to the appliance. The installation pan also improves installation by fixing the appliance to the pan and the pan to the mobile application structure, for example RV or marine craft. Further, the installation pan provides for a repeatable means of locating the appliance and consistent installation to reduce appliance problems that may be associated with incorrect installation.

32 Claims, 12 Drawing Sheets

(56) References Cited

U.S. PATENT DOCUMENTS

| | | | | |
|---|---|---|---|---|
| 2004/0263035 | A1* | 12/2004 | Lim | F25D 23/00 |
| | | | | 312/351.1 |
| 2008/0035033 | A1* | 2/2008 | Liebel | B65D 19/0026 |
| | | | | 108/56.1 |
| 2008/0163628 | A1* | 7/2008 | Lilke | F25B 21/02 |
| | | | | 62/3.6 |
| 2016/0324336 | A1* | 11/2016 | Maasen | A47F 3/0404 |

OTHER PUBLICATIONS buyengelcoolers.com: Engel Fridge-Freezer Transit Slide Locks dated Aug. 7, 2015.
RV Trade & Fleet, Slides; http://www.rvtradeandfleet.com.au/slides dated Aug. 1, 2015.

* cited by examiner

US 10,345,027 B1

APPLIANCE INSTALLATION PAN

CLAIM TO PRIORITY

This non-provisional patent application claims priority to and benefit of, under 35 U.S.C. § 119(e), U.S. Provisional Patent Application Ser. No. 62/279,975, filed Jan. 18, 2016 and titled "Appliance Installation Pan", all of which is incorporated by reference herein.

BACKGROUND

1. Field of the Invention

Present embodiments relate to an appliance installation pan. More specifically, present embodiments relate to an installation pan having which aids in appliance installation in mobile applications, such as for non-limiting example, recreational vehicle (RV), aircraft, or marine craft.

2. Description of the Related Art

One issue with use of appliances in mobile applications, such as refrigeration devices for non-limiting example, or otherwise, is that the appliance needs to be securely fixed during movement. However, the installation may vary with each installation, for example due to differing floor plans which may result in operating deficiencies of the appliance. Since the installation of the appliance generally occurs at a different location than the manufacture of the appliance, the result is that appliances may be installed in a variety of manners, some which are correct and some which may be incorrect.

Still further, additional problems may be that the appliance may be difficult to connect electrically, disconnect electrically, and remove from the installation position for repair. Even further, it is desirable that an appliance be situated relative to surrounding furniture appropriately.

Present refrigerators have been known to drip water or condensation over time which may damage a floor below. It is desirable to inhibit such damage to the flooring and or sub-flooring beneath the refrigeration and manage the water and condensation therein.

For these reasons, it may be desirable to provide an installation pan for appliances which collects drips, which provides for improved installation and facilitates improvement in removal of the appliance for service or repair. It may also be desirable to provide added functional features for the improvement of all of the above or other improvements.

The information included in this Background section of the specification, including any references cited herein and any description or discussion thereof, is included for technical reference purposes only and is not to be regarded subject matter by which the scope of the invention is to be bound.

SUMMARY

Present embodiments are related to an appliance installation pan which provides multi-functional improvement for at least installation, collection of fluid, and direction of air flow to the appliance. The installation pan also improves installation by fixing the appliance to the pan and the pan to the mobile application structure, for example RV or marine craft. Further, the installation pan provides for a repeatable means of locating the appliance and consistent installation to reduce appliance problems that may be associated with incorrect installation. Still further various optional features may be provided to the installation pan to improve functionality of the appliance such as electrical connections and other functionalities.

According to some embodiments, an appliance installation guide comprises a pan having a peripheral edge and an upper surface, at least one track positioned on said pan to guide an appliance on to or off of the pan, the at least one track receiving feet or rollers of the appliance, at least one partition formed on the pan to guide air movement along the pan, a mounting structure formed on the pan to allow mounting of the pan to a floor of a mobile structure.

Optionally, the appliance installation guide may further comprise a mounting location disposed on the installation pan, the mounting location receiving an inverter. The at least one flow path may pass air over the mounting location for the inverter. The mounting location may be formed at a rear of the pan. The mounting location being elevated above a surface of said pan. The mounting location may also be formed on a front lip of the pan. The front lip may have a grill and the inverter may be mounted adjacent to the grill. The at least one flow path may move the air to or from the appliance. The flow path may be a first flow path and a second flow path. The appliance installation guide may further comprise at least one lock to retain the refrigerator in a specific location relative to the pan. The installation guide may be formed of a single material or may be formed of multiple materials. The installation guide may limit a mounting depth of an appliance. The at least one track may be formed on elevated surfaces of the pan. The installation guide also allows for removal of an appliance. The at least one track allows for adjustment of an appliance relative to horizontal planes. The pan having at least one locating feature for locating the appliance relative to the pan. In one embodiment, the locating features may be a lock. The lock may retain the refrigerator at least one of vertically and horizontally. In other embodiments, the locating feature may be an edge. In some embodiments, the at least one flow path may be passive and driven by convection. In alternative embodiments, the ventilation flow path may be forced and driven by a fan. The pan being formed to define at least one plenum. The appliance installation guide may further comprise a power connector for providing power to the appliance. The pan may further comprise at least one wiring guide. The appliance installation guide may further comprise a communication module disposed on the pan. The pan may define a collection area to collect and direct condensation. The appliance installation guide may further comprise a ventilation grill.

According to some embodiments, an appliance installation guide comprises a pan having at least one peripheral edge and an upper surface, at least one track formed on the pan, the at least one track being at least partially elevated above the upper surface, the at least one track being capable of receiving feet of a refrigerator, a mounting location formed in the pan, the mounting location formed to locate an inverter and, the pan having a mounting structure to mount the pan in a desired location.

Optionally, the pan may define a ventilation flow path. The pan may provide protection for the inverter. The inverter may be positioned along a ventilation flow path. The inverter may define a portion of a plenum for the ventilation flow path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an appliance installation pan will now be described by way of examples. These embodiments are not to limit the scope of the claims as other embodiments of the appliance installation pan will become apparent to one having ordinary skill in the art upon reading the instant description. Non-limiting examples of the present embodiments are shown in figures wherein:

DETAILED DESCRIPTION

Figure 1:
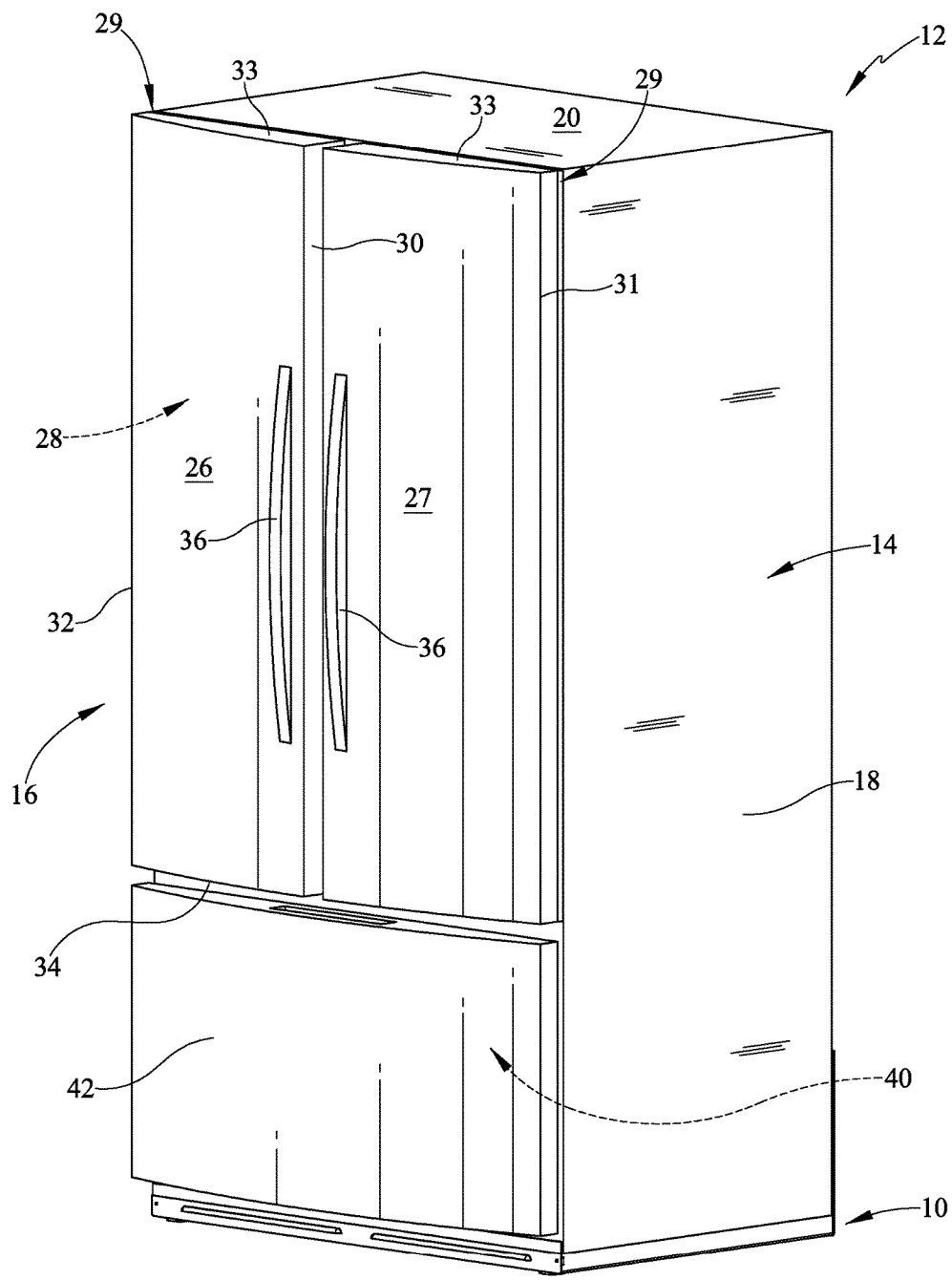
FIG. 1 is a perspective view of the appliance installation pan along with an example of a non-limiting appliance embodiment.

It is to be understood that the appliance installation pan is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-12 various embodiments of an appliance installation pan. The appliance installation pan is used with an appliance and provides a repetitive and secure installation with less possibility of mistake during installation of the appliance by an OEM. The installation pan may also aid in electrical connection of the appliance, as well as direction or guidance of air flow for improved cooling of the appliance. Still further, the appliance may include drip retaining function to preclude damage to the underlying flooring near the appliance.

Referring now to FIG. 1, a perspective view of an appliance installation pan 10 is shown with an appliance 12 positioned on the installation pan 10. The appliance 12, according to some embodiments may be a refrigerator, a freezer, a combination of both, or other appliance such as a dishwasher or a clothes washer, dryer or combination, for example and which is desirably mounted in a mobile application structure such as RV, marine craft or aircraft. Although the term "refrigerator" is utilized throughout this specification, the appliance should not be limited to a refrigerator specifically, as other appliances may be utilized and implemented in standalone fashion or in combination with other structures or appliances. The appliance 12 comprises a cabinet 14 having a first side wall 16, a second side wall 18 and a top 20. The cabinet 14 may also comprise a bottom and a rear side wall (not shown) to define a cabinet 14.

Figure 2:
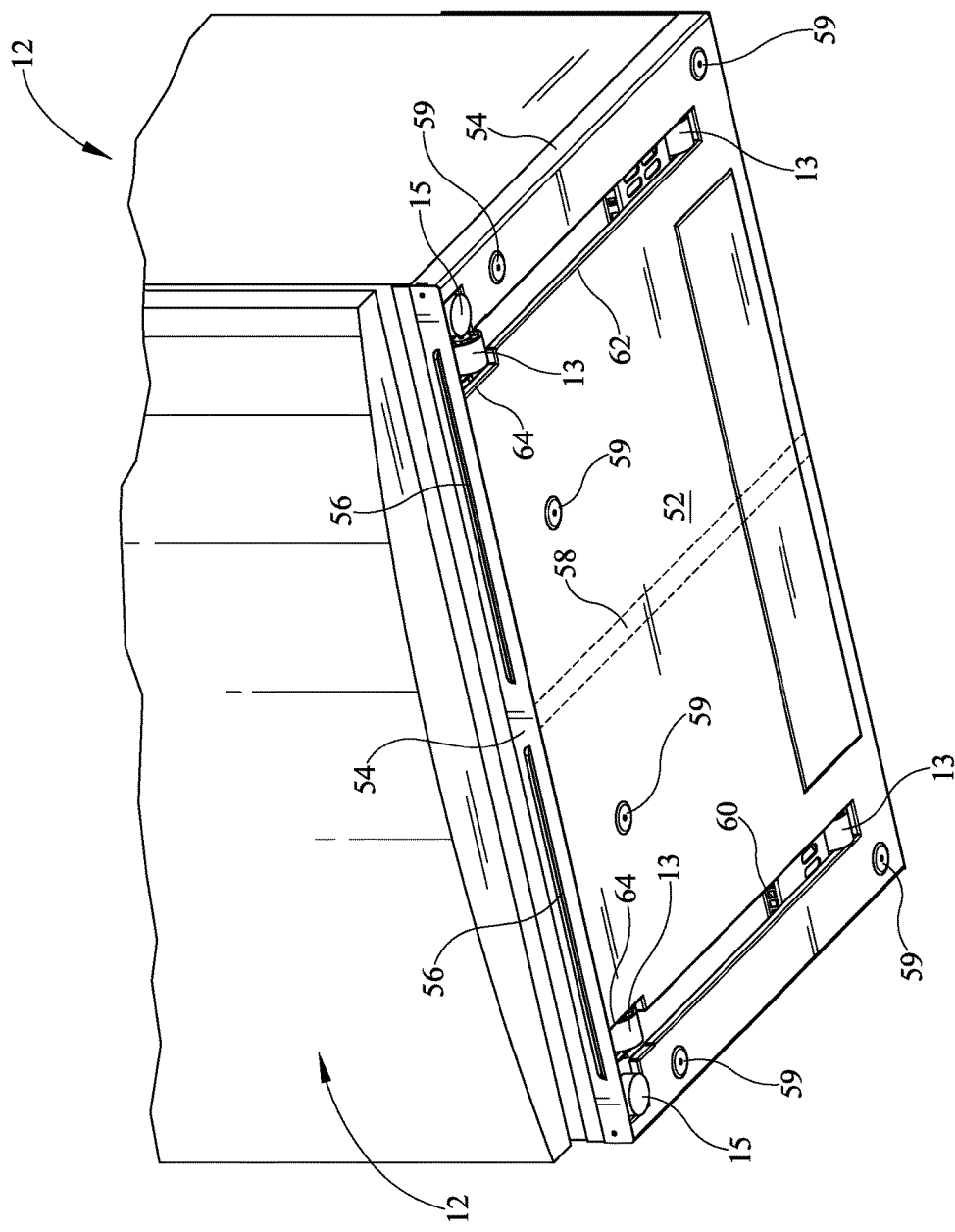
FIG. 2 is a lower perspective view of the appliance installation pan.

Along the front of the cabinet 14 is at least one door 26. Within the cabinet 14 is at least one compartment 28 behind the door 26. The upper compartment 28 provides a location for food storage, for example fresh or frozen food. The door 26 is connected by a hinge structure 29 which allows the door 26 to swing between a closed position, as depicted, and an open position, as shown in FIG. 2. The hinge structure 29 may be internal or external to the cabinet 14. The door 26 comprises a plurality of vertical edges 30, 31, and 32, and horizontal top and bottom edges 33, 34. These edges 30, 31, 32 provide a boundary for the at least one door 26 which may be opened by engaging a handle 36. The handle 36 may be connected to locking latch assemblies (not shown) to disengage the door 26 from the cabinet 14 along edge 30 and allow for pivoting opening of the door 26 at the hinge 29. Although the door 26 is shown with hinge 29 on the left side and handle 36 located on the right, the hinge 29 and handle 36 locations may be reversed to change the opening direction of the door 26. In still other embodiments, as shown, French or double doors may be used to close the upper compartment 28. In the instant embodiment, for example a second door 27 is disposed adjacent to the first door 26. The compartment 28 may be a single compartment or may be partitioned corresponding to the door arrangement.

Certain regulations require that RVs may have a locking latch mechanism to retain doors and drawers in a closed position so that, for example the doors 26, 27 do not open when the RV is on an incline or moving and the contents therein spill out or become projectiles. Accordingly, the handle 36 may have an integrated actuator to disengage the locking latches, for example. The actuator may be mechanical according to some embodiments.

Referring still to FIG. 1, the appliance 12 may further comprise a lower compartment 40 and a lower drawer 42 which is slidably positioned therein. In some embodiments however, the drawer 42 may also be a lower door. Still further, it should be understood by one skilled in the art that the larger upper compartment 28 and smaller lower compartment 40 may be a single compartment or alternatively, may be reversed so that the larger compartment is on the bottom and the smaller compartment is on the top. Still even further, the upper compartment 28 may also be provided to function as a slidable drawer and the lower compartment 40 may be a hinged door opposite to the depicted configuration. Further, one skilled in the art should understand that the lower compartment 40 may, according to some embodiments, be a freezer while the upper compartment 28 covered by the door 26 may be a refrigerator. However, in alternate embodiments, the appliance 12 may have a single compartment which is all refrigeration or a single compartment which is all freezer functionality. Further, the design may utilize an upper freezer compartment and lower refrigerator or vice versa. Thus, various alternate constructions and alternate appliances may be utilized with the appliance installation pan 10.

Referring now to FIG. 2, a lower perspective view of the appliance installation pan 10 is shown with the appliance 12 mounted thereon. The installation pan 10 may be formed of various rigid materials which can sustain the weight of the appliance 12. The installation pan 10 may be formed to support the weight of the appliance 12 alone or may be formed to support the weight with support below from flooring, structural support or a combination thereof for example. In some embodiments, structural supports may be used in combination with the installation pan 10. According to some embodiments, the installation pan 10 may be vacuum formed plastic or similar rigid or semi-rigid formable material. The material of the installation pan 10 may also be formed of materials that have damping characteristics so as to limit vibration of travel conditions to the appliance 12. In still other embodiments, the installation pan 10 may include multi-material construction in order to provide added strength for example by using metallic structural members for example in order to support the weight of the appliance or define tracks. The installation pan 10 may be formed to have a slight slope to meet the objective of not only retaining fluid leak or condensation, such as water or other fluids used in the appliance, but also guiding the fluid to a predetermined location, such as near the front of the installation pan 10 for example.

The installation pan 10 is sized to have a footprint which approximates a size of the appliance footprint. In this instance, the appliance installation pan 10 includes a peripheral edge 50 (FIG. 3) which is aligned with the appliance 12. Also shown is a lower surface 52 which may be generally flat or may have varying elevation changes either forward to rear or side to side (laterally).

Figure 3:
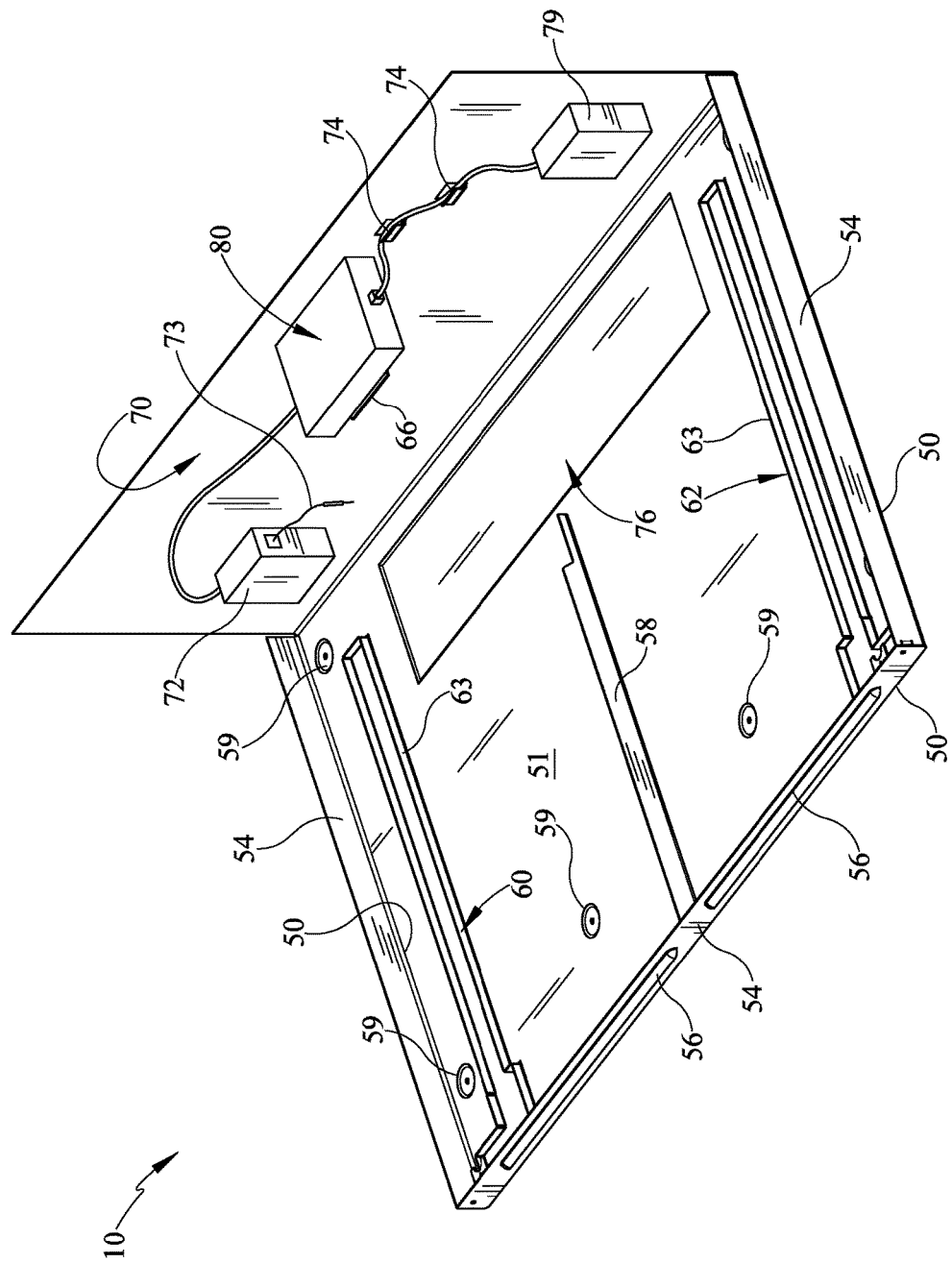
FIG. 3 is an upper forward perspective view of the appliance installation pan.

Around the peripheral edge 50 of the installation pan 10 may be a lip 54. The lip 54 may be formed integrally, for example by bending, or may be formed separately and fastened together, or alternatively, may be formed integrally with the installation pan 10 and may be fastened together or combinations thereof. The lip 54 may extend at one or more edges about the edge 50 of the installation pan 10. In the instant embodiment, the installation pan 10 includes two side lips 54, a front lip 54 and may include a rear lip or wall 70 (FIG. 3). The front lip 54 may include a grill formed of one or more vents or registers 56 to expel air from the installation pan 10 or take air into the installation pan 10 to move air to and from the appliance 12 for ventilation and cooling. In the instant embodiment, vents or registers 56 may optionally be louvered to require air flow to enter the installation pan 10 from a specific direction, if desirable. In the present embodiment, the louvered register or vent 56 may require that air flow turn upward to enter the installation pan 10, for example to preclude water or contaminants from remaining entrained in the air flow entering the installation pan 10 or may require that air flow turn upon exiting the vent or register 56. Other directions of air flow may be desirable depending on where the air flow is directed from into the installation pan 10. Still further, the air flow may be drawn in through the pan surfaces 51 (FIG. 3), 52 rather than the at least one lip 54. In such embodiment, the air may be directed upwardly through the installation pan 10 material and be directed to pass over the electronics module, for instance inverter 80 (FIG. 3).

The lip 54 may be formed to extend upwardly as depicted. In alternative embodiments, the lip 54 may turn downwardly to create a clearance between the lower surface 52 and the floor of the mobile application structure. This in either embodiment, a plenum may be defined wherein air flow may move along the installation pan 10 and upwardly to provide air flow to the appliance 12 for cooling of components therein. The lip 54 may have a height which accommodates adequate air flow without restricting cooling air needs of the appliance 12.

Figure 6:
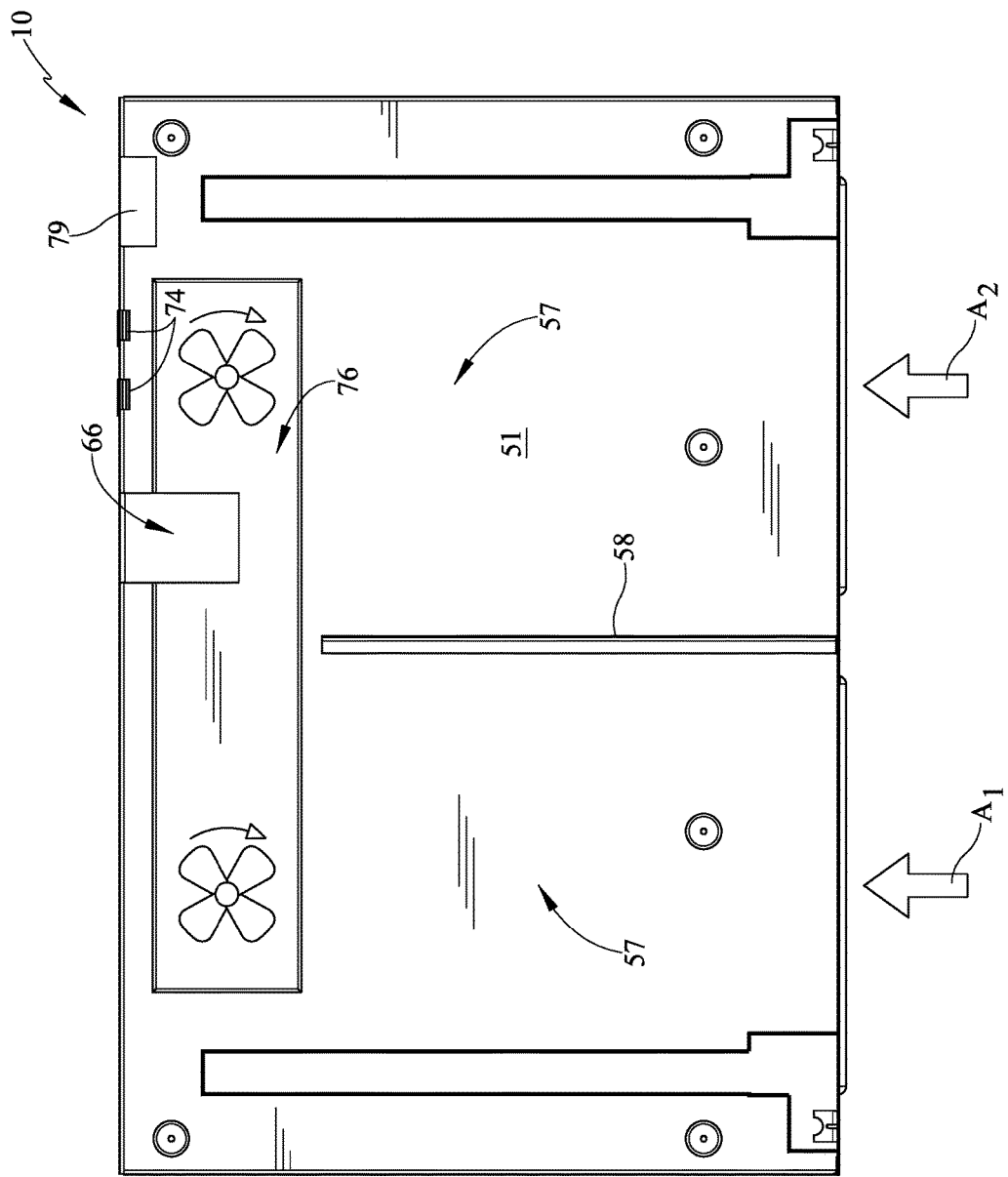
FIG. 6 is a top view of an appliance installation pan with one embodiment of air flow direction.

Also located on the installation pan 10 may be a partition 58 (see also FIG. 3) which may have various functions. In some embodiments, the partition 58 may be a rail-like structure which serves as a guide and to locate the appliance 12 relative to the installation pan 10 when positioning the appliance 12 to move rearward. Further, the partition 58 may also be a structural member to aid in limiting movement of the appliance 12 laterally relative to the installation pan 10. Further, the partition 58 may also be used to separate two air flows. In this view, the partition 58 is shown in broken line and this structure may be optionally used. For example, in some embodiments, if two vents or registers 56 are utilized, they may both be used to pull air into the plenum 57 (FIG. 6). In such embodiment, a partition 58 may not be desirable or needed. Alternatively, in an embodiment where the one or more vents or registers 56 brings cooling air in and the other expels heated air from the appliance 12, the two directions of air flow may require separation and a partition 58 may be desirable.

Further, while the partition 58 (FIG. 3) is not shown extending fully to separate the installation pan 10 into two separate sections, such construction may be used. Alternatively, the depicted partition 58 may be combined with other features or structures to finally separate air flows, as described further herein. For example, the partition 58 may be combined with other structures such as adhesive, foam, plastic combinations or combined with other adjacent structures, either on the installation pan 10 or on the appliance 12 to fully partition air flows.

As further depicted in FIG. 2, the installation pan 10 includes at least one mounting structure 59. In the depicted embodiment, there are a plurality of mounting structures 59. The mounting structures 59 may take various forms but provide a functionality of allowing fixing of the installation pan 10 and appliance 12 to the floor or other fixing structure, such as joist or other structural member of the mobile application structure, such as RV or marine craft. Additionally, or alternatively, one or more of the mounting structures 59 may be utilized to affix the appliance to the installation pan 10. For example, a fastener may be directed upwardly through the pan to engage the appliance 12 and other fasteners directed downwardly to engage the mounting structure 59 on the floor of the mobile application structure. Thus, the mounting structures 59 may aid in both installation and removal of the appliance 12 by way of removal of fixing bolts, fasteners, connectors or the like to disengage the appliance 12 from the installation pan 10. This will aid installation by removing some or all variables for the installer such as cut out size, horizontal position, rail location, but also service and repair and may be improved by presenting the service person with a easily defined structure and method for removal of the appliance 12.

The installation pan 10 provides the added functionality of providing proper positioning of the appliance 12 relative to adjacent furniture, cabinetry or the like. The installation pan 10 may utilize the mounting structure 59 and one or more adjacent holes in the floor or floor structural members to standardize and render consistent mounting locations in floorplans of mobile application structures, such as for non-limiting example, RVs, marine craft, aircraft or the like.

The mounting structures 59 are shown integrally formed and may be bolt holes through which fasteners, such as bolts, may pass. Additionally, vibration damping devices such as rubber feet or other spring-like or elastic materials may be seated on or near the at least one mounting structure 59. Such vibration damping material will aid in damping travel vibration from the appliance 12 and may lead to longer life of the appliance 12.

Also shown in the depicted embodiment, is at least one track 60. The at least one track 60, is according to at least one embodiment, two tracks. The two tracks 60, 62 may be defined in a variety of manners. According to the depicted embodiment, the tracks 60, 62 may be formed of a cutout which receives feet 15 or rollers 13 of the appliance 12. The tracks 60, 62 provide that the appliance 12 may be guided backward along the installation pan 10 and also removed more easily when service or repair is required.

In some embodiments, the tracks 60, 62 are formed of a cutout in the installation pan 10. At a forward end of the pan, the track includes a head 64 which is of a larger dimension than the remainder of the track 60, 62. The head 64 receives a first foot 15 or roller 13 and allows for movement rearward of the appliance 12. The tracks 60, 62 have a length that allows for seating of both feet 15 and rollers 13 along each side of the appliance 12. While there is shown a single track at laterally opposite sides of the installation pan 10, the present embodiments may also include variations wherein shorter segments of track are disposed or formed near the lateral ends of the installation pan 10.

As shown within the head 64, the appliance may have feet 15 which are separate of the feet 15 or roller 13. The feet 15 may be utilized to provide adjustment to one or more planes of the appliance 12 in order to level, for example. The head 64 of the tracks 60, 62 provides a location for positioning of the feet 15 and adjustment of the feet to stabilize the appliance 12. In some instances, the feet 15 may be adjustable to raise or lower the appliance 12 for purpose of leveling. Such leveling may be provided relative to one or more planes and the installation pan 10 allows for access to the leveling hardware. In the instant embodiment two feet 15 are described but according to other embodiments, the appliance 12 may include additional adjustment structures. In other embodiments, the appliance 12 may not comprise such adjustable feet but instead the adjustment for leveling formed in the installation pan 10. In such embodiment, the installation pan 10 may be formed to also allow for leveling relative to one or more planes in addition or independently of the appliance.

Referring now to FIG. 3, an upper perspective view of the installation pan 10 is depicted. In this view, the appliance 12 (FIG. 2) is removed and an upper surface 51 is shown. The installation pan 10 includes at least one peripheral edge 50 and may be have a lip 54 folded upwardly to define a locating feature. Further, the lip 54 may also form the plenum 57 or such plenum 57 (FIG. 6, 7) may be above the upper surface 51 or may be below the lower surface 52 (FIG. 2).

One function of the installation pan 10 is to collect condensate water and water leakages that may occur with appliances. For example, in appliances such as refrigerators having ice makers, it is common for the appliances to develop leaks or have leakages develop from, for example water filter replacement processes or otherwise have condensation water which must be collected. In the instant embodiment, the installation pan 10 may be formed to have fluid collection area 76 which is sized to be less than the entire periphery of the installation pan 10. Alternatively, the fluid collection area 76 may also be defined by the entire periphery of the installation pan 10 by utilizing the lip 54 that surrounds the periphery of the installation pan 10 to retain fluid. This effectively creates a large pooling area. However, the collection areas may also be smaller than the areas shown. In some embodiments, the installation pan 10 may be sloped slightly to direct water to a preselected area or location. The tracks 60, 62 may also be formed with lips or walls 63 in order to define the tracks 60, 62 and further limit or preclude any fluid from leaking from the installation pan 10 and out through the apertures defining the tracks 60, 62. Alternatively, or in addition, in some embodiments, the installation pan 10 or collection area 76 may have channels to drain the water and direct it to a preselected area. This may be desirable if leakage is expected in one area, but the collection area is formed in a second area. In still further embodiments, the air flows moving over the installation pan 10 may be directed over the collected water, or alternatively channels may be used to direct water to areas adjacent to the air flows in order to aid in evaporating the collected water.

In the depicted embodiment, the lip 54 may be formed integrally with the installation pan 10 and/or joined at the corners, by a fastener, weld or other joining feature. The lip 54 may be continuous or may be formed of separate overlapping parts in order to better control air flow. Further, the lip 54 may extend upwardly toward a lower edge of the appliance 12 in order to limit air leakage between the appliance 12 and the installation pan 10. Otherwise stated, if it is desirable to direct air in a specific manner, such as through the vents or registers 56, the lip 54 may be used to contact the appliance 12 or get close thereto in order to limit air flow between. Alternatively, if some air flow is desired between the installation pan 10 and the appliance 12, the lip 54 may be spaced from the lower edge of the appliance 12.

Figure 7:
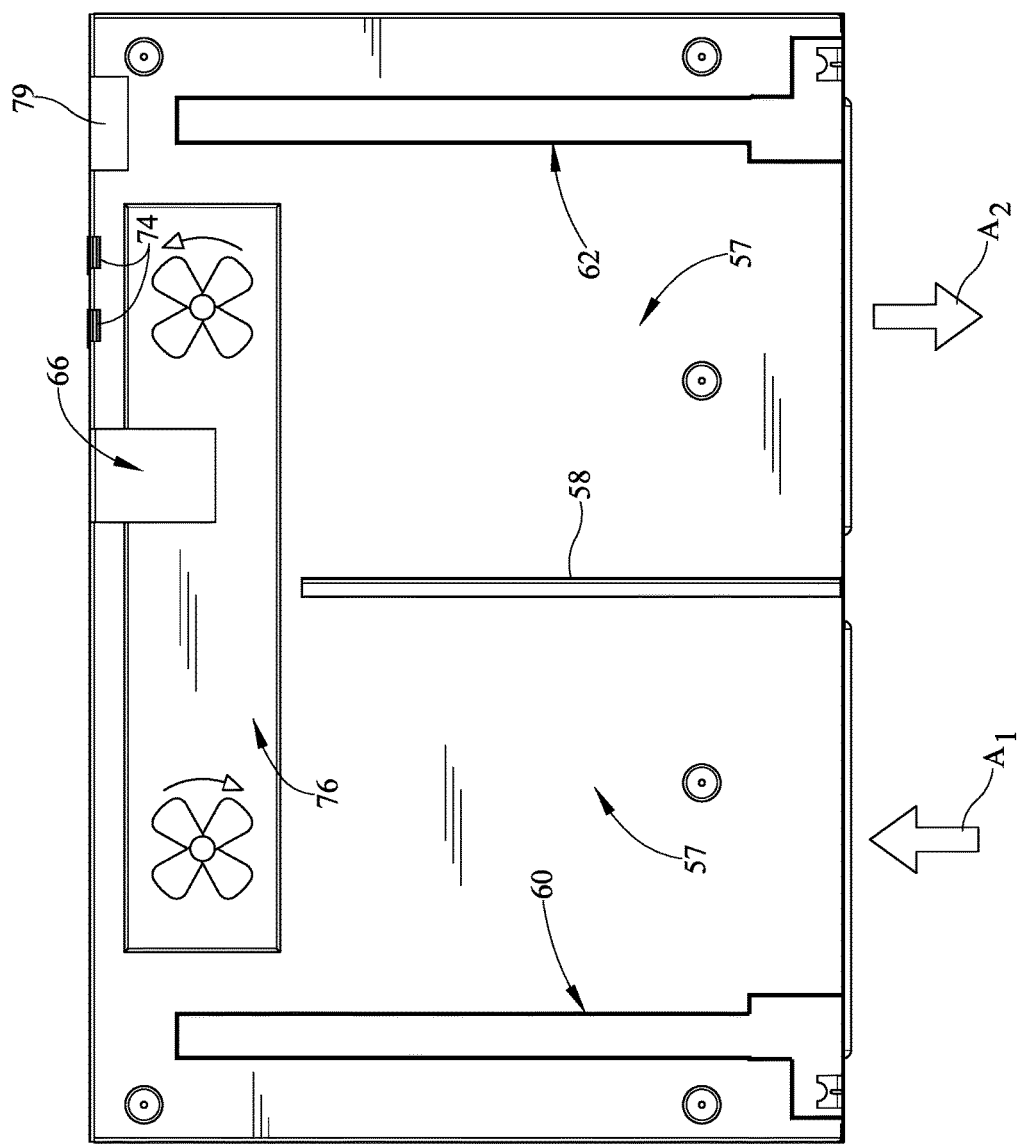
FIG. 7 is a top view of an appliance installation pan with a second embodiment of air flow direction.

The installation pan 10 is further depicted with a partition 58 extending upwardly from the upper surface 51. The partition 58 may be a structural rail feature primarily. Additionally, the partition 58 may be used to guide air flow. Air flow for cooling of the appliance 12 is extremely important in the tight quarters of a mobile application structure such as an RV or trailer. In some appliance applications, cooling air flows from below the appliance 12 upwardly through the appliance 12. In the instant embodiment, the installation pan 10 must be able to accommodate the desired flow pattern of the appliance 12. The partition 58 can guide air flows depending on the desired circulation pattern within the installation pan 10. In one embodiment, and with additional reference to FIG. 6, two air flows are shown. In one embodiment, there are two air flows $A_1$, $A_2$ both moving through the vents or registers 56 from the forward end of the installation pan 10 toward the rear. These air flows $A_1$, $A_2$ may be induced by one or more fans on the appliance 12, such as a condenser fan, or may be passive or naturally occurring due to heat convection patterns within the appliance 12. Alternatively, as shown in FIG. 7, the air flows $A_1$, $A_2$ may be in opposite directions so that one flow is inbound relative to the installation pan 10 and the other air flow is outbound. Additionally, while these patterns are directionally opposite, the directions may vary such that the directions are only differing, but not necessarily opposite. Further, while the arrows representing air flows are shown in the front surface of the installation pan 10 at lip 54, it may also be formed to direct air flow into or out of the appliance at other locations of the lip 54, for example side to side, side to front, or side to rear, or further, air flow may be drawn through the upper surface 51. The installation pan 10 should be formed to accommodate necessary air flow to cool the appliance 12.

Figure 8:
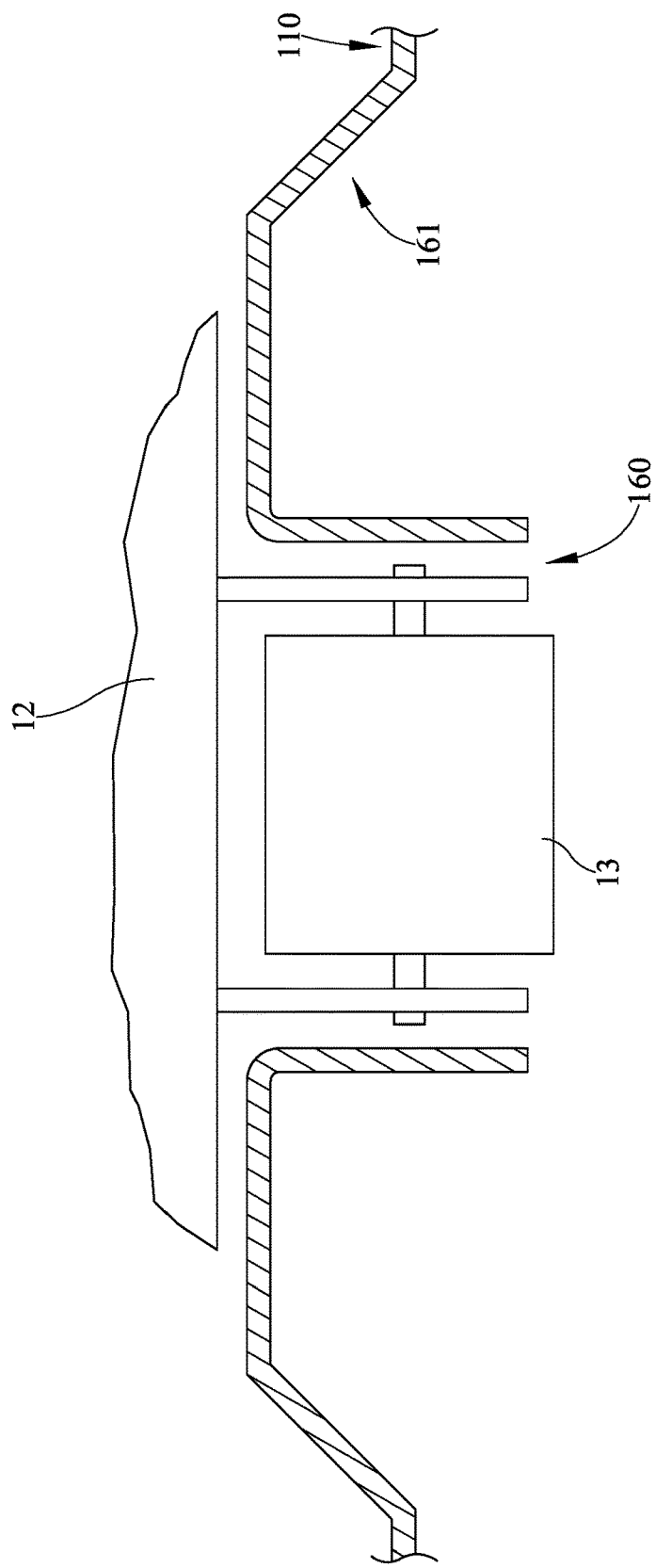
FIG. 8 is an alternate embodiment of an appliance installation pan with an elevated pan surface and depressed track.
Figure 9:
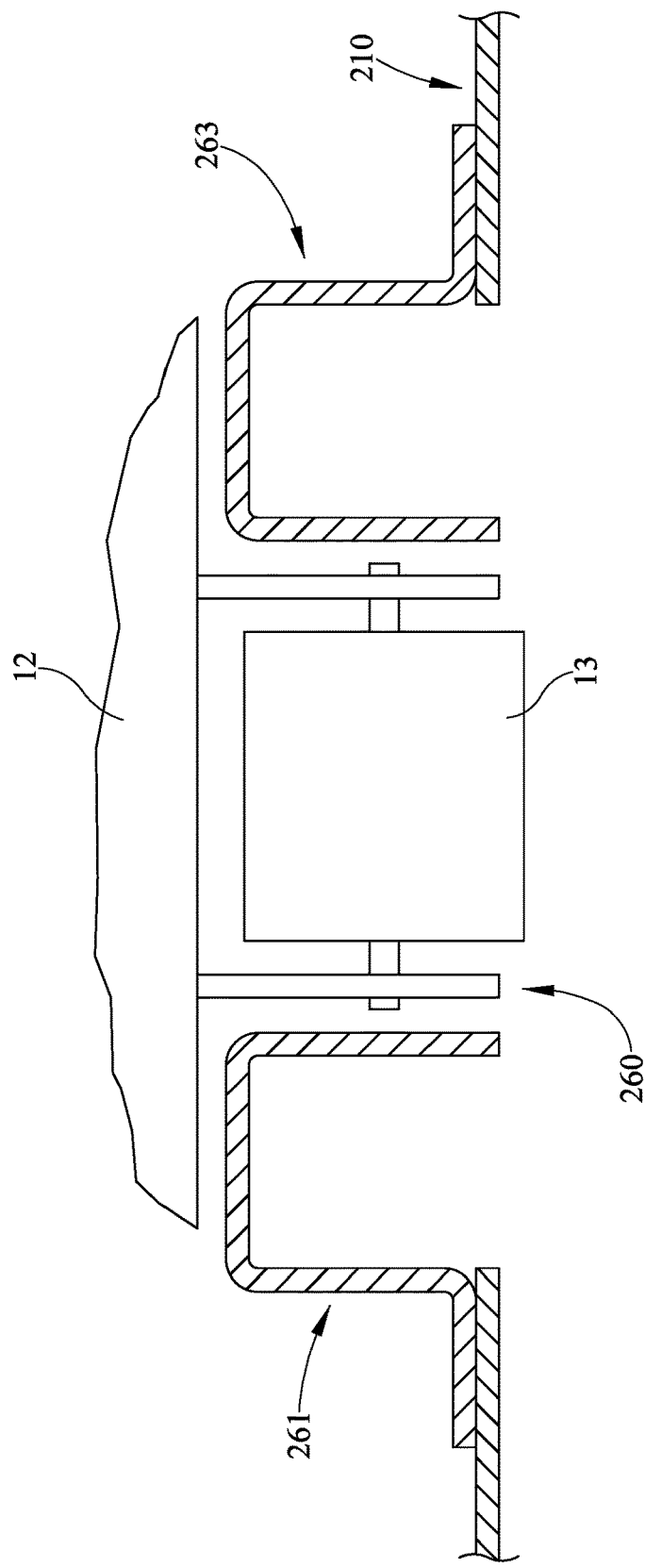
FIG. 9 is a further alternative embodiment of an appliance installation pan with a track formed of additional structural members.

Referring still to FIG. 3, the installation pan 10 also includes the mounting structures 59 on the upper surface 51. The installation pan 10 also has the tracks 60, 62 shown therein. In this embodiment, the tracks 60, 62 are apertures formed in the upper and lower surfaces 51, 52 of the installation pan 10. The tracks 60, 62 may be formed in a variety of ways. According to the depicted embodiment, the tracks 60, 62 may have at least one surrounding wall 63 which surrounds the tracks 60, 62. The wall 63 defines the aperture wherein the refrigerator feet 15 or rollers 13 (FIG. 2) may be located. The apertures which define the tracks 60, 62 allow for the engagement of the rollers 13 or feet 15 to the floor below. In alternate embodiments, the tracks 60, 62 may be elevated or may be depressed in the installation pan 10. In other words, the installation pan 10 need not be generally flat, but instead may be of various forms and having varying elevations so long as the appliance 12 will fit thereon. Further, the tracks 60, 62 may be formed of additional structures rather than formed from the pan material integrally. For example, the walls 63 may be formed of a separate structural members as shown in FIGS. 8 and 9, rather than punched from the pan material, in order to provide boundaries to guide the appliance during installation, as well as retain water or fluid on the pan. The appliance may be elevated along the structures or may be located on or below the pan surface level, as the appliance is guided between the structural elements defining the tracks.

Further, in installing the appliance 12 in the installation pan 10, one skilled in the art will recognize that the forward lip 54 may be removably fit. For example, as shown, the forward lip 54 may be fitted to the adjacent lips by fasteners so that the forward lip 54 may be removed to slide the appliance 12 into place, for example from forward to rear. Next, upon positioning of the appliance 12, the forward lip 54 may be put into position. This will preclude movement of the appliance 12 from the installation pan 10.

At the rear of the installation pan 10 may be a wall 70 which may be formed with the installation pan 10 and bent upright as depicted, or may be formed of a separate piece of material and joined. The rear wall 70 may define a rear boundary which engages the appliance 12 and forms a stop for positioning the appliance 12 on the installation pan 10. As noted above, in some embodiments, the appliance 12 may be pushed on to the installation pan 10 and will move rearward toward the rear wall 70.

On the rear wall 70, various accessories may be mounted to improve functionality of installation of the appliance 12 and the installation pan 10 in the mobile application structure. For example, the rear wall 70 may have a retractor 72 which is shown generically. The retractor 72 may include a power cord 73 which connects to an inverter 80 so that the power cord 73 may be extended from the retractor 72 toward the appliance 12 before the appliance 12 is positioned on the installation pan 10, and subsequently retracts the power cord 73 as the appliance 12 is moved on to the pan. This makes simpler the installation process and inhibits the power cord 73 from becoming a hindrance to installation or from becoming damaged either during or after installation.

Still further, one or more wire guides 74 may be located on the rear wall 70 in order to route power or other wiring. For example a power, signal or both, wire or cable having one or more conductors may extend between the inverter 80 and a communication module 79. In such arrangement, the wire or cable may be routed along the rear wall 70 through wire guides 74. In the instant embodiment, the wire guides 74 are depicted as clips. The wire guides 74 may be fastened to the rear wall or in other embodiments, such as depicted, may be formed integrally with the rear wall 70 by, for example stamping wire guides 74 from the rear wall 70. In other embodiments, the wire guides 74 may be formed to surround the wire or cable either in whole or in part such as by a conduit like structure which may be connected to or formed with the rear wall 70. Further, the wire guides 74 may be also be located on the pan surface 51 in addition or alternatively to the rear wall 70. Still further, the wire guides may be located along the peripheral edges either on the pan surface 51 or along wall or lips. Thus the wire guides may be located in various places to aid in routing along the installation pan 10 and may be elevated or on the surface 51.

Also shown on the rear wall 70 of the installation pan 10 is at least one mounting location 66 which may be integrally formed with the installation pan 10, may be connected to the installation pan 10, or may be some combination thereof. The mounting location 66 provides a location for mounting of at least one electronics module, such as an inverter 80. In the instant embodiment, the inverter 80 may provide power to the appliance 12 and/or other features, such as for example a communication module 79 located on the rear wall 70. The mounting location 66 is shown in one embodiment as a bracket which supports the inverter 80 from below, but may be formed in various manners. While the bracket 66 is shown extending from the rear wall 70, other forms of positioning an inverter 80 may be utilized, for example the mounting location 66 may be formed as an indention or depression in the rear wall to fully or partially support the inverter 80. The inverter 80 may be formed to receive fasteners or may be utilized with a tape, or hook and loop material. As shown, it may be desirable to elevate the mounting location 66 so that any fluids collected in the installation pan 10 cannot damage the inverter electronics.

The mounting location 66 may also be positioned to allow for air flow over any utilized electronics module, for example the inverter 80, to provide cooling for such module. Additionally, while the bracket embodiment of the mounting location 66 is shown as a solid material, the mounting location 66 may alternatively be formed having a plurality of apertures to allow air flow over any module mounted at such location. Still further, while the mounting location 66 is located at the rear of the installation pan 10 in the depicted embodiment, the mounting location 66 may alternatively be located on the pan surface or elevated in an alternate location, or as described further, may be located near the front edge of the pan or near a side edge.

The communications module 79 may provide wired or wireless communication with the appliance 12 and with other computers or handheld devices such as smartphones, smart pads, portable computers and vehicle controllers to allow for control of the appliance 12, if desirable. Any of various known communication protocols may be used for the wired or wireless communications.

Figure 4:
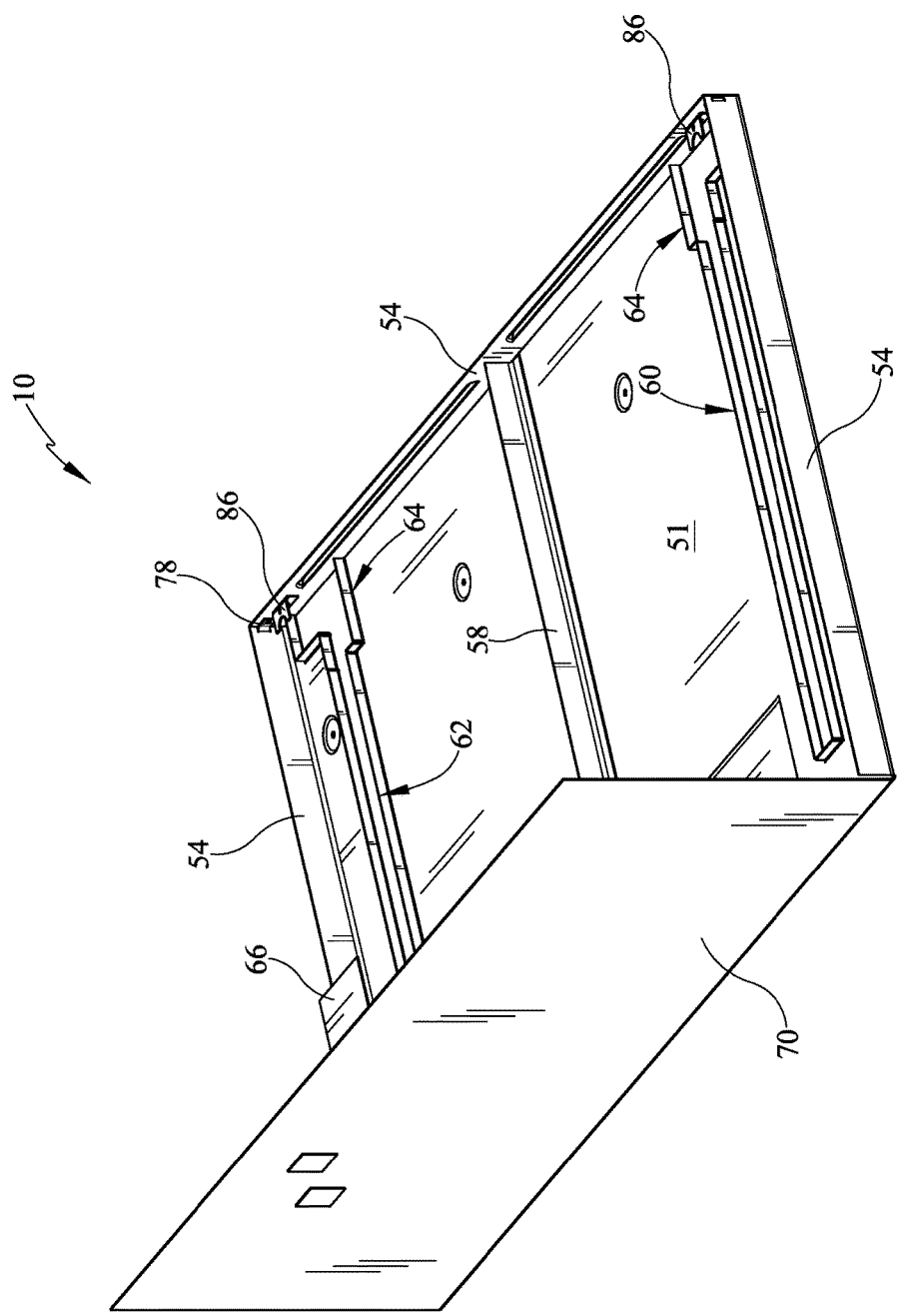
FIG. 4 is an upper rear perspective view of the appliance installation pan.

With reference now to FIG. 4, a rear upper perspective view of one pan 10 embodiment is depicted. The installation pan 10 is shown having the forward and side lips 54 and partition 58. While the partition 58 is shown centrally located, the partition 58 may be located in other locations depending on where the air flow is needed to the appliance 12 or depending on allowance locations along the lower portion of the appliance 12. The partition 58 may also have other shapes. For example in one embodiment, the partition 58 is shown linearly extending in a straight line. However, in other embodiments, the partition 58 may have other shapes having varying height or constant height as shown. Further, the partition 58 may extend in a lateral direction rather than forward to rearward. Of course any alternate shape or orientation of the partition 58 may have to cooperate with the lower portion of the appliance 12.

In this view, the head 64 of the tracks 60, 62 may be formed to have a varying size relative to the remainder of the tracks 60, 62 moving rearward. The instant embodiment has a wider head 64 so that when the appliance 12 is properly seated, the feet 15 (FIG. 2) of the appliance 12 are disposed within the head 64. The head 64 may also be sized to allow for use of a tool to adjust the feet 15 of the appliance 12 for purpose of leveling. Thus, while a head 64 is shown at the forward end of the installation pan 10, heads 64 may be utilized in the tracks 60, 62 or elsewhere on the installation pan 10 so that appliance feet 15 may be located and further so that the feet 15 may be adjusted if desirable.

Also shown at the ends of the forward lip 54 and the side lips 54 are fastener nuts 78. The nuts 78 may have a traditional form such as hexagonal or octagonal, or in the alternative, may be formed of other structures so that they are connectable to the lips 54 or other portions of the installation pan 10. These may be welded to the inside surfaces of the lips 54 or otherwise located in the areas of overlap of the lips 54 so that the forward lip 54 may be fastened to the remainder of the installation pan 10 when the appliance 12 is installed. In the instant embodiment, a nut 78 may be connected to a side or lateral lip 54 and receive a fastener through the front lip 54.

Figure 5:
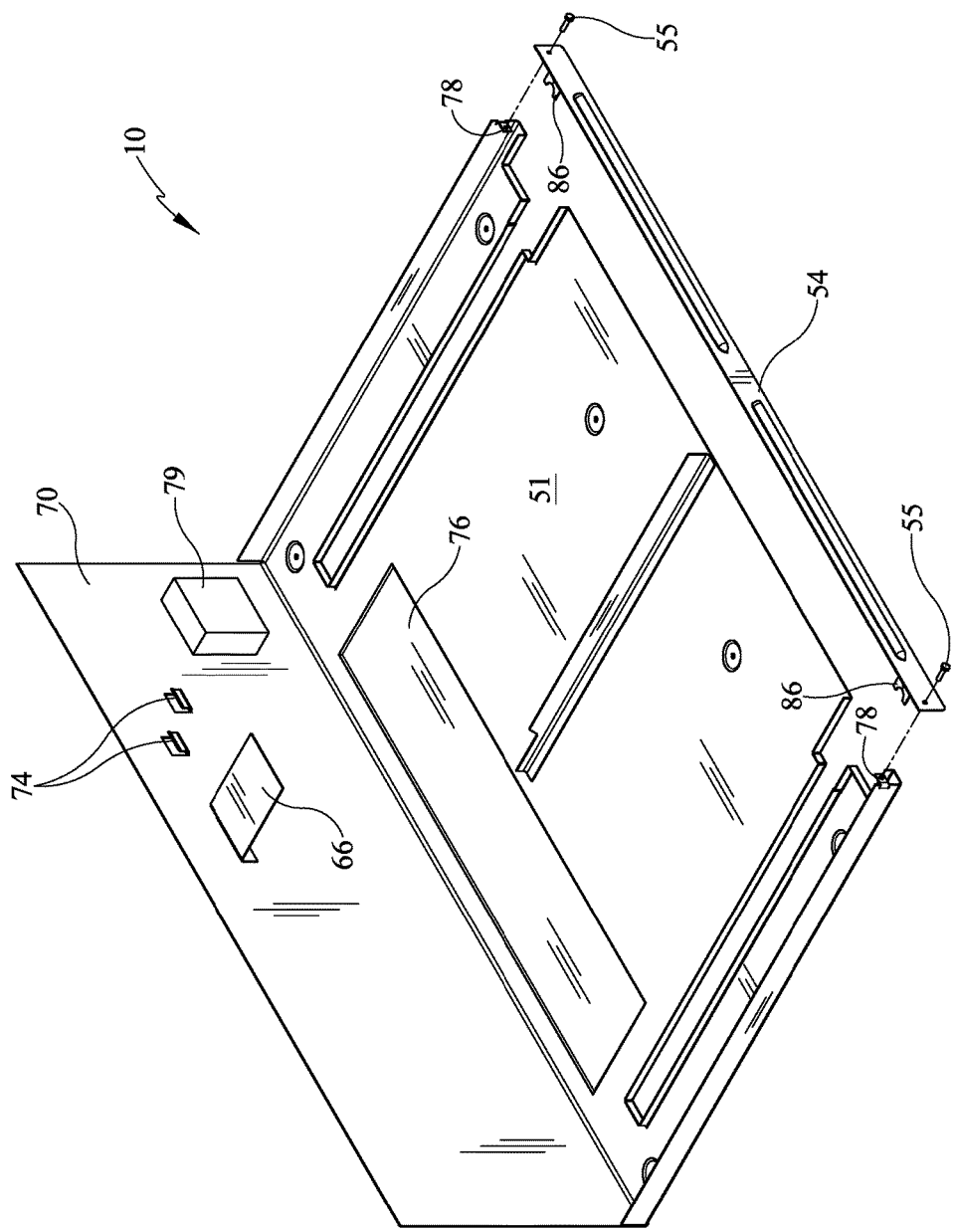
FIG. 5 is an upper partially exploded perspective depicting an example of connection of the front lip of the pan to the side lip structures.

With reference to FIG. 5, a partially exploded front perspective view of the installation pan 10 is shown. As shown at the forward end of the installation pan 10, the lip 54 is connected by a fastener 55. With additional reference to FIG. 4, at the forward end of the installation pan 10, the forward lip 54 includes a catch 86 to retain or lock the appliance 12 in position relative to at least one direction. For example, the appliance catch 86 may engage each of the feet 15 to retain the appliance 12 in the forward-rearward direction as well as retain the appliance 12 in the upward-downward direction. The end of the embodied catch opposite lip 54 is semi-circular in shape and may engage a portion of the appliance 12 such as, for example, a rotatable leg 17 (FIG. 10) extending from the feet 15.

With reference now to FIG. 8, a further embodiment of a track 160 is shown. The appliance 12 is shown located in a track 160 which differs from the previous embodiment in that a separate structural member may be used to define the track 160 and connected to the installation pan 110. Alternatively, the track 160 may be formed from the pan material and elevated such that the appliance 12 is lifted from the surface of the installation pan 110, or the appliance 12 may be located between the structural members as shown. In either embodiment, the track 160 may define a guide to aid in movement rearward of the appliance 12. The roller 13 of the appliance is located between structural members in this area. The material bend 161 forms an alternate structure for defining the track 160.

With reference to FIG. 9, in still a further embodiment, a track 260 may be formed in an alternative way. For example, the track 260 is formed by installing alternate structural members 261, 263 to define an area for the roller 13 therebetween. In this embodiment, the track 260 is formed of two inverted U-shaped structural members 261, 263 to define an area where the roller 13 may be located for movement of the appliance 12. The tracks 260 may be formed by one structural member wherein the roller 13 may be located for movement. Or, alternatively, the tracks may be formed of two structural members, for example to define a track therebetween. Still further, the structural members 261, 263 may be elevated or may be depressed relative to the upper surface of the installation pan 210.

Figure 10:
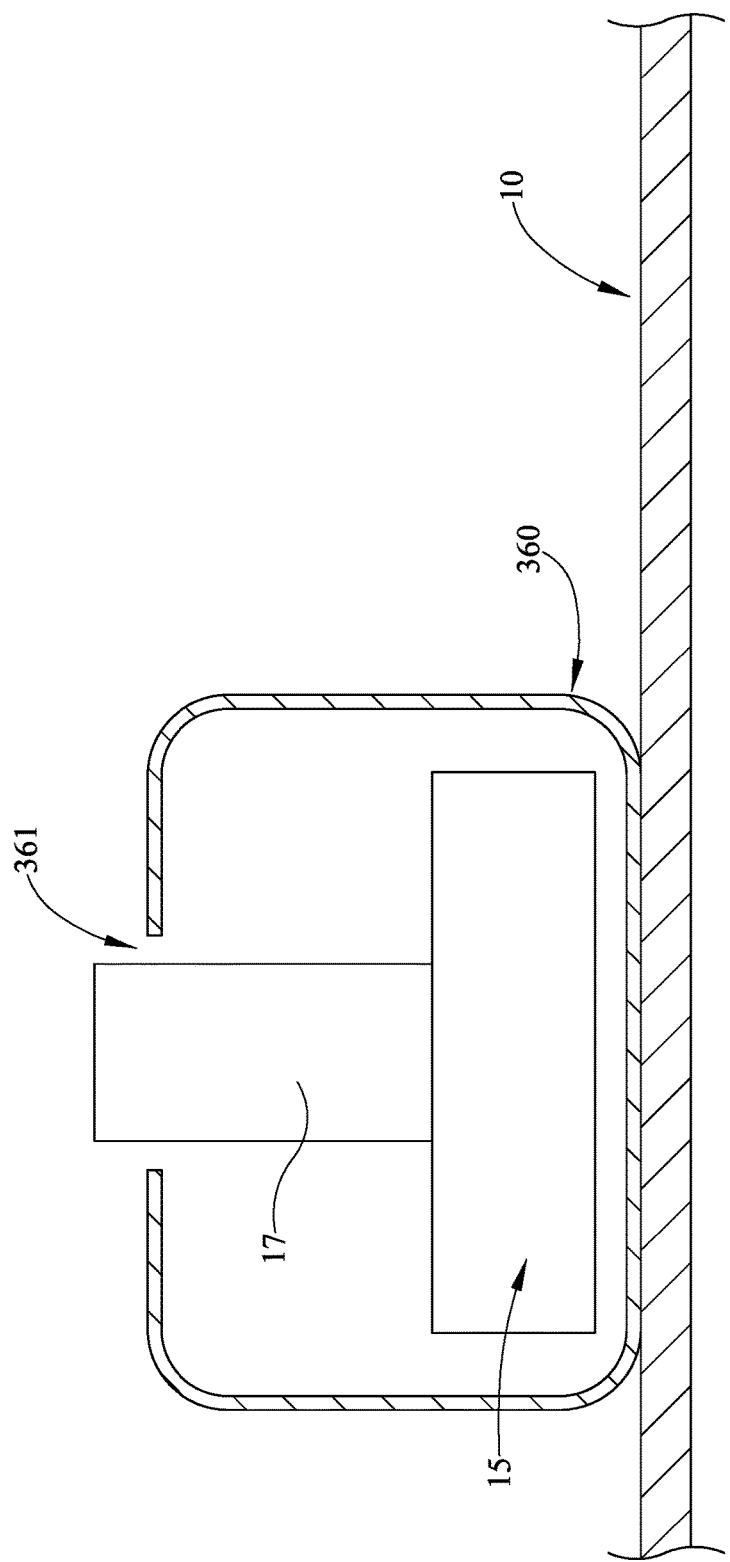
FIG. 10 is a still further alternative embodiment of a track which may be utilized.

Further, with reference to FIG. 10, an example end view of a further embodiment is shown. In this end view, an alternate track 360 is shown having a nearly enclosed cross-section. In the instant embodiment, an opening 361 is provided so that roller 13 (FIG. 9) or, as depicted, the foot 15 and the leg 17 may extend upwardly through the track 360. The track 360 may be formed of various structural member shapes and may be formed of metal or other rigid material which may be integrally formed with the installation pan 10 or may be formed and subsequently connected.

Figure 11:
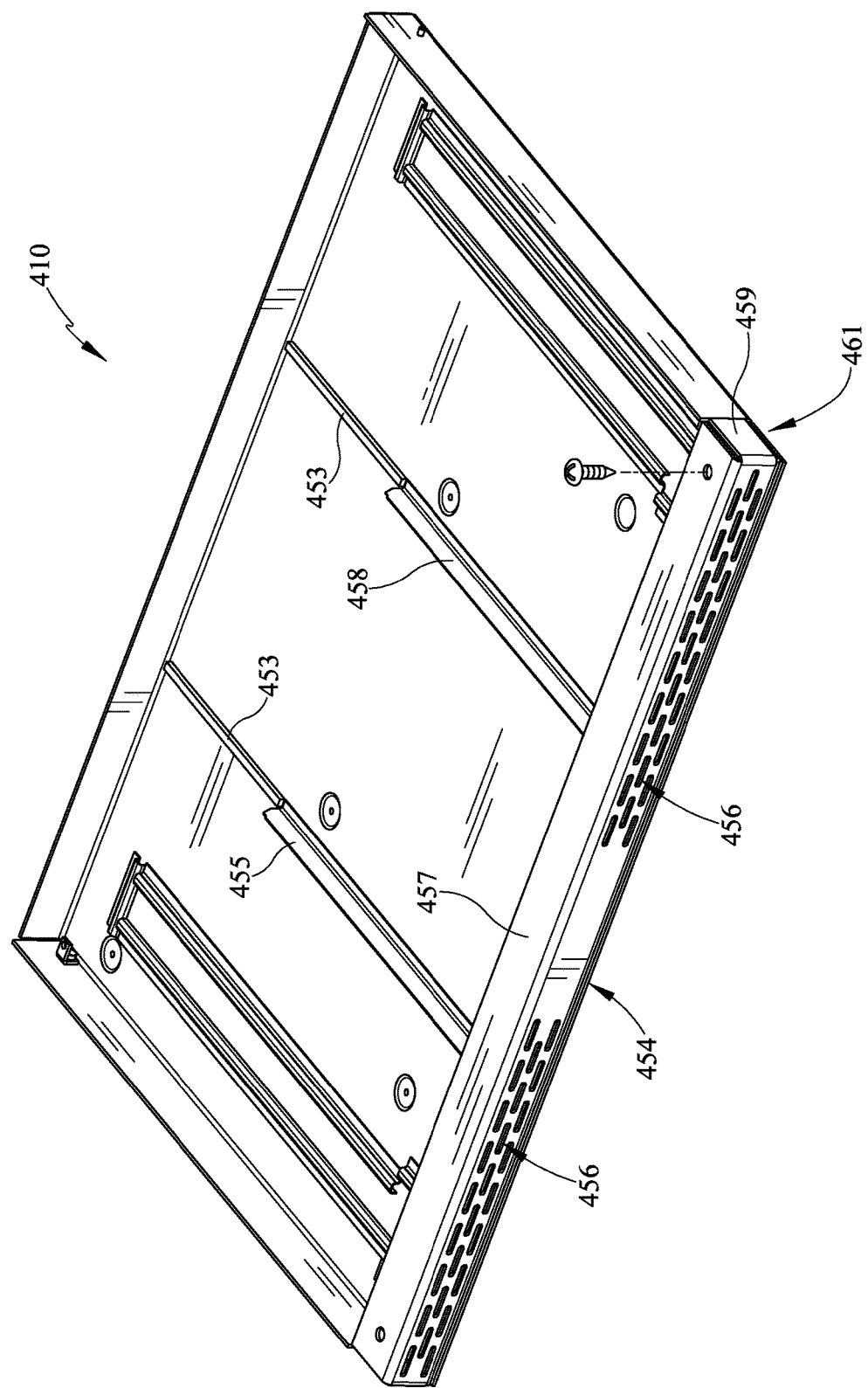
FIG. 11 is an upper front perspective view of a further embodiment of the appliance installation pan; and, FIG. 12 is an upper rear perspective view of a further embodiment of the appliance installation pan.
Figure 12:
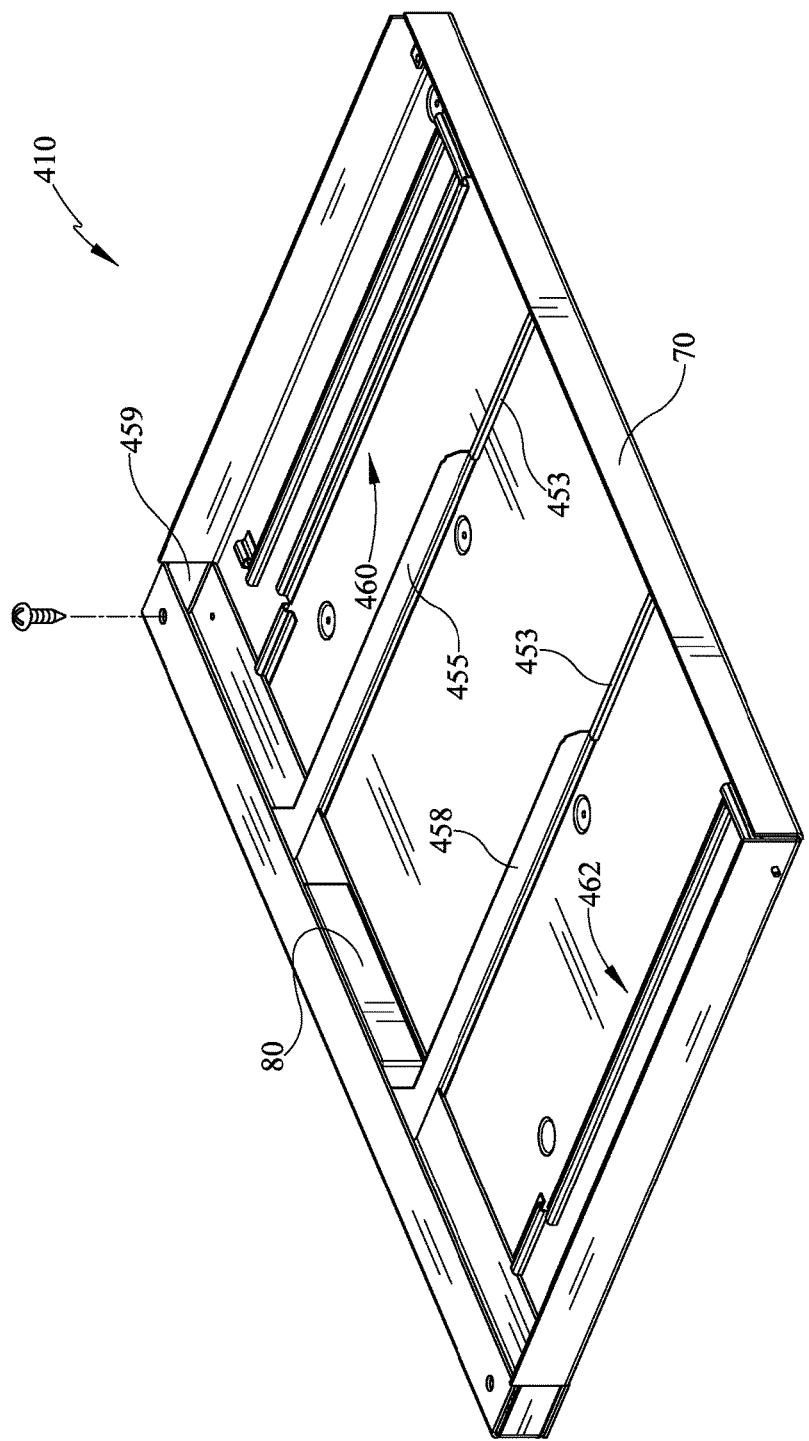

With reference now to FIGS. 11 and 12, a further embodiment of an installation pan 410 is shown. The installation pan 410 includes tracks 460, 462 which may be embodied by any of the previously described track embodiments. In the embodiment of FIGS. 11 and 12, an alternate grill design is shown on the forward lip 454. In some area of the forward lip 454, the inverter 80 is located so that cooling air is drawn across the inverter 80. The inverter 80 is shown in FIG. 12 and is generally located in the center of the front lip 454. The air being drawn into the installation pan 410 may be cooler and therefore the inverter 80 is located on the intake side of the at least one partition 458. However, in some embodiments, the exhaust air may be blown over the inverter 80 if cooling is deemed to be sufficient. In the depicted embodiment, the at least one partition 458 includes two partitions 455, 458 creating up to three distinct air flow paths. One or more partitions may be utilized to create a number of variations of flow paths. Additionally, the partitions 455, 458 which are extended by seals 453 to create separate flows to extend partitions as needed. The seals 453 may be formed of foam, plastic or other sealing materials. The seals 453 may also be used on the upper edge of the partitions 455, 458 to add height as needed. Further, while the partitions 455, 458 are generally shown extending from front to rear on the installation pan 410, the partitions 455, 458 may be oriented in various directions depending on how the movement of airflow is needed or desired.

The mounting location at the forward lip 454 also provides for easier power connection. In this embodiment, still further, the inverter 80 may be easier to connect to other powered connections, such as within the appliance 12, because the inverter 80 is at the front of the installation pan 410 rather than behind the appliance 12.

Still further, as with the previous embodiment, the front lip 454 may be removed from the remainder of the installation pan 410. The front lip 454 may not only have the front surface with the grill 456, but may also have an upper wall 457 and a lower wall 461, as well as side walls 459 which define a partial enclosure wherein the inverter 80 may be located.

As with the previous embodiment, the appliance 12 is first positioned on the installation pan 410. Next, the front lip 454 is applied to the installation pan 410. The front lip 454 may be connected in a variety of ways. In the instant embodiment, the upper wall 457 of the front lip may be connected by a fastener. However, a fastener is not the sole means of connection as other integral locking mechanisms or releasable connections may be utilized. As with the other embodiments, the front lip 454 may or may not be used to lock the appliance 12 in position on the installation pan 410. Still further, the front lip 454 may be removed when service or repair of the appliance 12 is required, so that the appliance 12 may be removed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An appliance installation guide, comprising:
   a pan having a peripheral edge and an upper surface, said pan further comprising side lips and a rear wall;
   a removable lip disposed near a front edge of said pan and facing a forward direction of an appliance, said removable lip comprising a louvered vent disposed in said removable lip configured to move air through said removable lip;
   at least one track positioned on said pan to guide an appliance on to or off of said pan, said at least one track receiving feet or rollers of said appliance;
   at least one partition formed on said upper surface of said pan to guide air movement along said pan;
   a mounting structure formed on said pan to allow mounting of said pan to a floor of a mobile structure; and,
   wherein said pan is intended to remain with said appliance when said appliance is in use.

2. The appliance installation guide of claim 1, further comprising a mounting location disposed on said installation guide, said mounting location receiving an inverter.

3. The appliance installation guide of claim 2 wherein a flow path of said air passes about said mounting location for said inverter.

4. The appliance installation guide of claim 3, said mounting location formed at said rear wall of said pan.

5. The appliance installation guide of claim 4, said mounting location being elevated above a surface of said pan.

6. The appliance installation guide of claim 3, said mounting location formed on a front lip of said pan.

7. The appliance installation guide of claim 6, said inverter mounted adjacent to said louvered vent.

8. The appliance installation guide of claim 1, wherein a flow path of said air moves at least one of to or from said appliance.

9. The appliance installation guide of claim 8, said flow path being a first flow path and a second flow path.

10. The appliance installation guide of claim 1, further comprising at least one lock to retain said appliance in a specific location relative to said pan.

11. The appliance installation guide of claim 1, said installation guide being formed of a single material.

12. The appliance installation guide of claim 1, said installation guide being formed of multiple materials.

13. The appliance installation guide of claim 1, said installation guide limiting a mounting depth of an appliance.

14. The appliance installation guide of claim 1, said at least one track being formed on elevated surfaces of said pan.

15. The appliance installation guide of claim 1, said installation guide also allowing for removal of an appliance.

16. The appliance installation guide of claim 1, said at least one track allowing for adjustment of an appliance relative to horizontal planes.

17. The appliance installation guide of claim 1, said pan having at least one locating feature for locating said appliance relative to said pan.

18. The appliance installation guide of claim 17, wherein said locating feature is a lock.

19. The appliance installation guide of claim 18, wherein said lock retains said appliance at least one of vertically or horizontally.

20. The appliance installation guide of claim 17, wherein said locating feature is an edge.

21. The appliance installation guide of claim 17, wherein a flow path of said air is passive and driven by convection.

22. The appliance installation guide of claim 17, wherein a flow path of said air is forced and driven by a fan.

23. The appliance installation guide of claim 1, said pan being formed to define at least one plenum.

24. The appliance installation guide of claim 1, said pan further comprising a power connector for providing power to said refrigerator.

25. The appliance installation guide of claim 1, said pan further comprising at least one wiring guide.

26. The appliance installation guide of claim 1 further comprising a communication module disposed on said pan.

27. The appliance installation guide of claim 1, said pan defining a liquid collection area to collect and direct at least one of condensation or fluid leaks.

28. An appliance installation guide, comprising:
   a pan having at least one peripheral edge and an upper surface, said pan comprising side lips and a rear wall;
   a removable lip disposed at a forward end of said pan and facing a forward direction of an appliance, said removable lip having a vent grill allowing for movement of air through said removable lip;
   at least one track disposed on said pan, said at least one track being at least partially elevated above said upper surface;
   said at least one track being capable of receiving feet of a refrigerator;
   a mounting location formed on said pan, said mounting location formed to locate an inverter; and,
   said pan having a mounting structure to mount said pan in a desired location; and,
   wherein said pan is intended to remain with said appliance when said appliance is in use.

29. The appliance installation guide of claim 28, said pan defining a ventilation flow path.

30. The appliance installation guide of claim 28, said pan providing protection for said inverter.

31. The appliance installation guide of claim 30, said inverter being positioned along a ventilation flow path.

32. The appliance installation guide of claim 31 wherein said inverter defines a portion of a plenum for said ventilation flow path.

* * * * *